(12) United States Patent
Haven

(10) Patent No.: US 8,036,423 B2
(45) Date of Patent: Oct. 11, 2011

(54) CONTRAST-BASED TECHNIQUE TO REDUCE ARTIFACTS IN WAVELENGTH-ENCODED IMAGES

(75) Inventor: Richard Haven, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 950 days.

(21) Appl. No.: 11/546,748

(22) Filed: Oct. 11, 2006

(65) Prior Publication Data

US 2008/0089605 A1   Apr. 17, 2008

(51) Int. Cl.
*G06K 9/00* (2006.01)

(52) U.S. Cl. ........ 382/103; 382/104; 382/105; 382/106; 382/107; 382/173; 382/181; 382/190; 382/195; 382/199; 382/205

(58) Field of Classification Search .......... 382/103–107, 382/141–152, 181, 190–208, 241–251, 274, 382/275, 309, 173
See application file for complete search history.

(56) References Cited

U.S. PATENT DOCUMENTS

| | | | | |
|---|---|---|---|---|
| 5,734,736 A * | 3/1998 | Palmer et al. | ................. | 382/103 |
| 6,184,781 B1 * | 2/2001 | Ramakesavan | ............... | 340/435 |
| 6,711,280 B2 * | 3/2004 | Stafsudd et al. | .............. | 382/106 |
| 6,757,415 B1 * | 6/2004 | Rogers et al. | ................. | 382/130 |
| 7,088,845 B2 * | 8/2006 | Gu et al. | ...................... | 382/103 |
| 2004/0258305 A1 * | 12/2004 | Burnham et al. | ............. | 382/171 |
| 2005/0133693 A1 * | 6/2005 | Fouquet et al. | ........... | 250/214 R |
| 2006/0062454 A1 * | 3/2006 | Fan et al. | ..................... | 382/164 |

* cited by examiner

*Primary Examiner* — Bhavesh Mehta
*Assistant Examiner* — Daniel Zeilberger

(57) ABSTRACT

A system for identifying artifacts in an image. The system includes an input for receiving images from an imager, the images comprising a pixel of interest. The images can be generated by reflecting light off an object. The system further includes a processor coupled to the input for defining and using at least one contrast value of a second pixel associated with the pixel of interest to identify artifacts in the image.

15 Claims, 9 Drawing Sheets

800

Emitting light at an object, the object comprising a retroreflector
802

↓

Capturing an image of the object by using light reflected from the object, the image comprising a plurality of pixels
804

↓

Defining and using at least one computed contrast value associated with at least one of the plurality of pixels to identify an artifact
806

800

```
┌─────────────────────────────────────────┐
│  Emitting light at an object, the object │
│       comprising a retroreflector        │
│                  802                     │
└─────────────────────────────────────────┘
                    │
                    ▼
┌─────────────────────────────────────────┐
│ Capturing an image of the object by using│
│ light reflected from the object, the image│
│         comprising a plurality of pixels │
│                  804                     │
└─────────────────────────────────────────┘
                    │
                    ▼
┌─────────────────────────────────────────┐
│  Defining and using at least one computed│
│ contrast value associated with at least  │
│ one of the plurality of pixels to identify│
│              an artifact                 │
│                  806                     │
└─────────────────────────────────────────┘
```

FIG. 8

CONTRAST-BASED TECHNIQUE TO REDUCE ARTIFACTS IN WAVELENGTH-ENCODED IMAGES

TECHNICAL FIELD

The present invention relates to optical imaging. More specifically, embodiments of the present invention relate to reducing artifacts in wavelength encoded images.

BACKGROUND ART

There are a number of applications in which it is of interest to detect or image an object. The object may be detected in daylight or in darkness, depending on the application. Wavelength-encoded imaging is one technique for detecting an object, and typically involves detecting light reflecting off the object at two or more particular wavelengths. Images of the object are captured using the reflected light and the presence of the object is then detected in the images. Light reflecting off elements other than the object result in artifacts in the captured images.

FIG. 1 is a graphic illustration of a conventional image 100. Image 100 includes object 102 and artifact 104. Object 102 is the object to be detected, but artifact 104 can make it difficult to detect object 102. A system designed to detect object 102 may mistake artifact 104 for object 102, thereby resulting in a false detection of object 102. Alternatively, the system may be unable to distinguish object 102 from artifact 104 and therefore fail to detect the presence of object 102 in image 100.

A system for detecting artifacts in an image would be an improvement over the art.

SUMMARY OF THE INVENTION

Embodiments of the present invention include a system for identifying artifacts in an image. The system includes an input for receiving images from an imager, the images comprising a pixel of interest. The images can be generated by reflecting light off an object. The system further includes a processor coupled to the input for defining and using at least one contrast value of a second pixel associated with the pixel of interest to identify artifacts in the image.

Embodiments of the invention also include a system for processing an image comprising a light source for emitting light at an object, the object comprising a retroreflector. The system further includes an imager for capturing a plurality of images of the object by using light reflected from the object, the plurality of images comprising a plurality of pixels. The system further includes a processor coupled to the imager for defining and using at least one computed contrast value associated with at least one of the plurality of pixels to identify the retroreflector.

Additional embodiments of the present invention include emitting light at an object, the object comprising a retroreflector, capturing a plurality of images of the object by using light reflected from the object, the plurality of images comprising a plurality of pixels and defining and using at least one computed contrast value associated with at least one of the plurality of pixels to identify the retroreflector.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

FIG. 8 is a data flow diagram of an exemplary method for detecting artifacts in an image in accordance with embodiments of the present invention.

DETAILED DESCRIPTION OF THE INVENTION

Embodiments of the present invention provide a system and method for detecting artifacts in an image of an object. In one embodiment of the invention, the direction of travel of a person or object can be determined by tracking light reflected off of the object. In one embodiment of the invention, the object comprises a retroreflector. Movement of the object is determined by tracking the position of the retroreflector. In one embodiment of the invention, light reflected off of the retroreflector is used to track the position of the object. In one embodiment of the invention, light reflected off objects other than the retroreflector is considered an artifact in an image.

Techniques for detecting artifacts in images of objects are included in the detailed description as exemplary systems that use image detection. In one embodiment of the invention, the object includes a retroreflector. A retroreflector is a type of surface with unusual reflectance characteristics, namely that it reflects light mainly back in the direction from which it came. This makes retroreflecting surfaces appear much brighter than matte surfaces, if the light source is in the same direction as the viewer, and dark otherwise. Retroreflecting surfaces are often found on road markings and signs. In one embodiment of the invention, the retroreflector is used to track movement of an object and/or identify a position or orientation of an object by tracking light reflected from the retroreflector.

Embodiments in accordance with the invention, however, are not limited to these implementations and include a variety of image detection applications. For example, embodiments in accordance with the invention include the detection of movement along an earthquake fault, the detection of the presence, attentiveness, or location of a person or subject, and the detection of moisture in a manufacturing subject. Additionally, embodiments in accordance with the invention also include medical and biometric applications, such as, for example, systems that detect fluids or oxygen in tissue and systems that identify individuals using their eyes or facial features.

Some embodiments in accordance with the invention detect one or more objects using wavelength-encoded imaging, while other embodiments in accordance with the invention detect one or more objects using time-encoded imaging. With time-encoded imaging, multiple images of an object or objects are captured in sequential frames using light propagating at one or more wavelengths.

Figure 1:
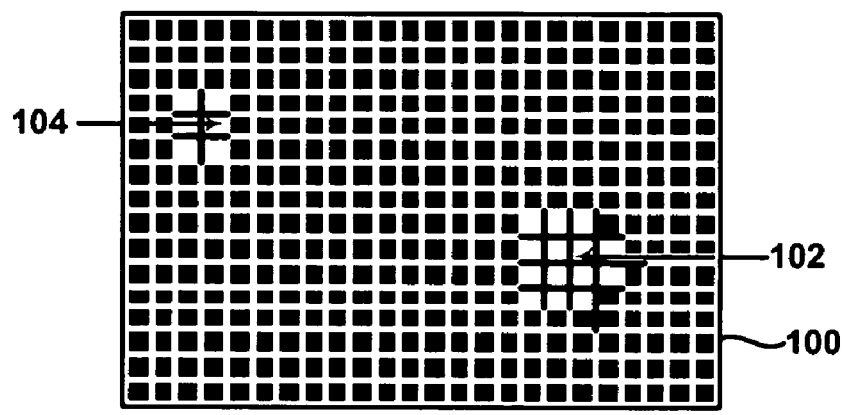
FIG. 1 is an illustration of an image comprising an artifact.
Figure 2:
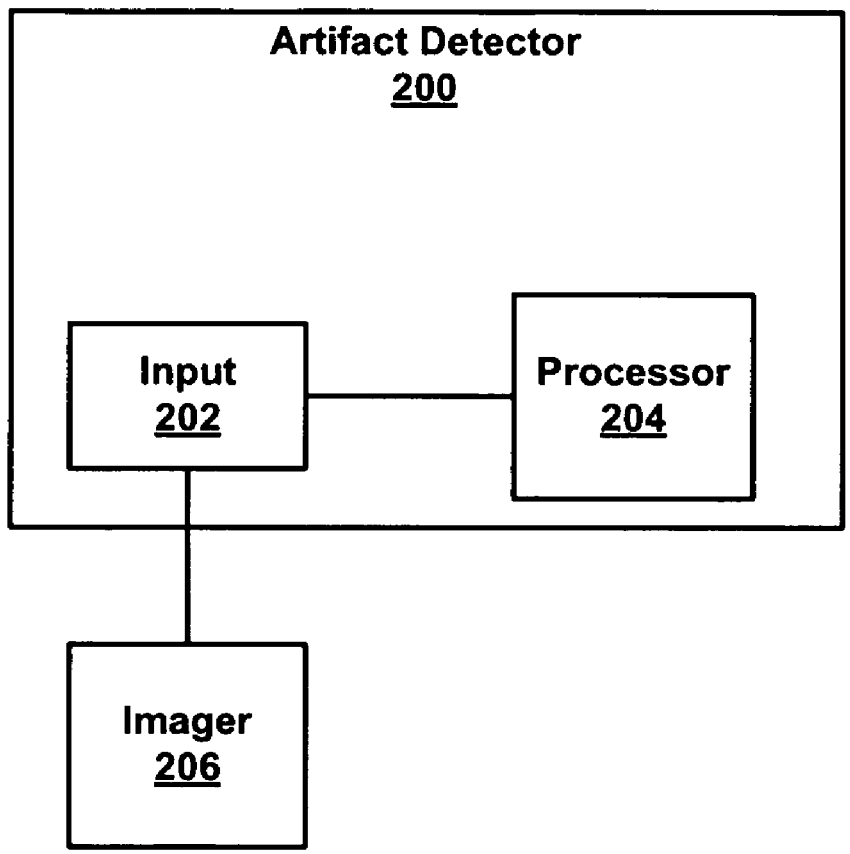
FIG. 2 is a block diagram of an exemplary system for detecting artifacts in an image in accordance with embodiments of the present invention.

FIG. 2 is a block diagram of an exemplary artifact detection system 200 in accordance with embodiments of the present invention. Artifact detector 200 comprises an input 202 for receiving images captured from an imager 206. Coupled to input 202 is a processor 204 for processing the images received at input 202.

Figure 3:
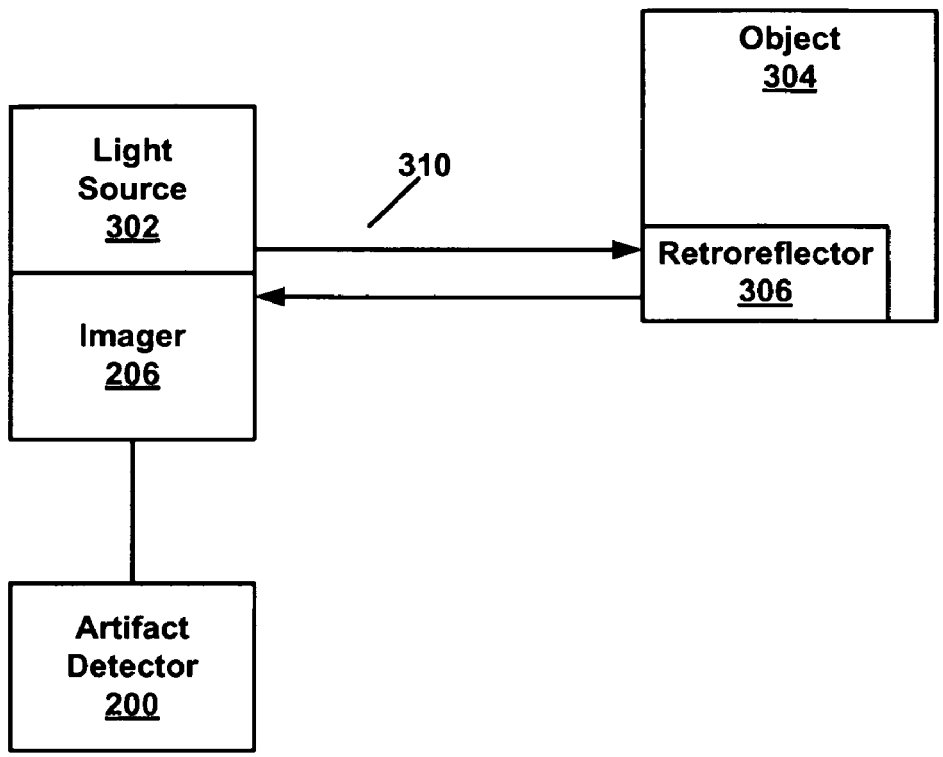
FIG. 3 is a block diagram of an exemplary system for detecting artifacts in an image of an object comprising a retroreflector in accordance with embodiments of the present invention.

FIG. 3 is a block diagram of an exemplary system 300 for detecting artifacts in an image of an object 304 comprising a retroreflector 306 in accordance with embodiments of the present invention. In one embodiment of the invention, the imager 206 comprises a light source 302 for emitting light 310 towards an object 304. In one embodiment of the invention, light source 302 comprises a light emitting diode (LED) or an array of LEDs. In one embodiment of the invention, light 310 emitted from light source 302 is substantially invisible to the human eye (e.g., in the infrared region of the light spectrum).

In one embodiment of the invention, the imager 206 comprises a photodetector (not shown) for receiving light 310 reflected off of the object 304. Embodiments of the present invention use an image processor (204 of FIG. 2) in the artifact detector 200 to identify artifacts in an image of the object 304. In one embodiment of the invention, the processor deciphers light reflected off specular objects from light reflected off a retroreflector 306. In one embodiment of the invention, the retroreflector is used to track movement and position of object 304. In one embodiment of the invention, retroreflector 306 comprises a light wavelength filter (not shown) disposed over the surface of the retroreflector 306 for filtering a particular range of wavelengths of light (e.g., the filter filters all wavelengths of light with the exception of the wavelength generated by light source 302).

In another embodiment of the invention, the imager 206 comprises a light wavelength filter (not shown) for filtering a particular range of wavelengths of light (e.g., the filter filters all wavelengths of light with the exception of the wavelength generated by light source 302). In one embodiment of the invention, the light filter is a patterned light filter. In one embodiment of the invention, the filter is a checkerboard pattern that filters an image into a binary image (e.g., filters the image into two channels).

Figure 4:
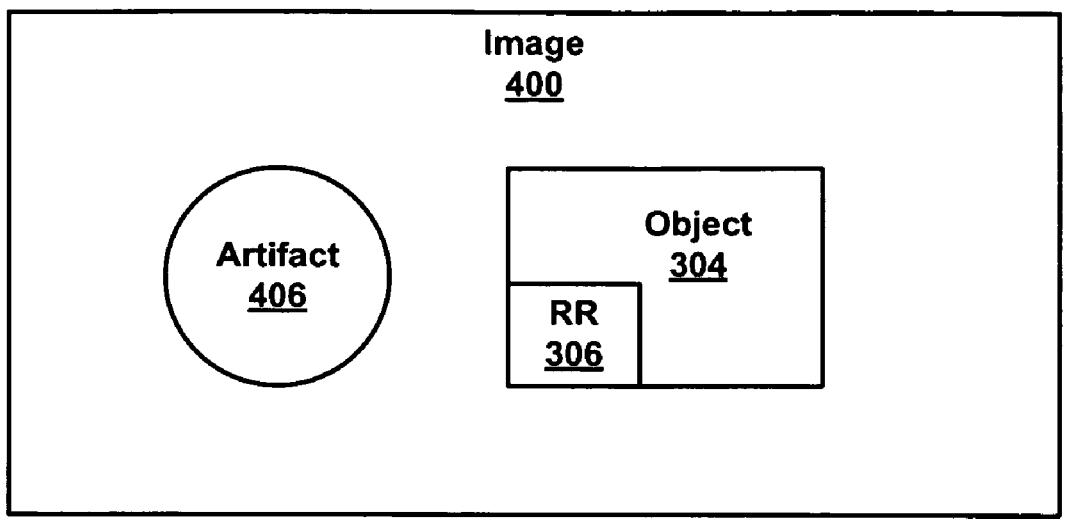
FIG. 4 is an illustration of an exemplary image of an object and an artifact in accordance with embodiments of the present invention.

FIG. 4 is an illustration of an exemplary image 400 of an object 304 and an artifact 406 in accordance with embodiments of the present invention. Image 400 is an image that is captured without the use of a light filter at the imager end. Artifact 406 could be any reflection from any object. For example, artifact 406 could be a reflection from a piece of jewelry or a light source other than the light source associated with the imager (e.g., a flashlight, headlight, etc.).

Figure 5:
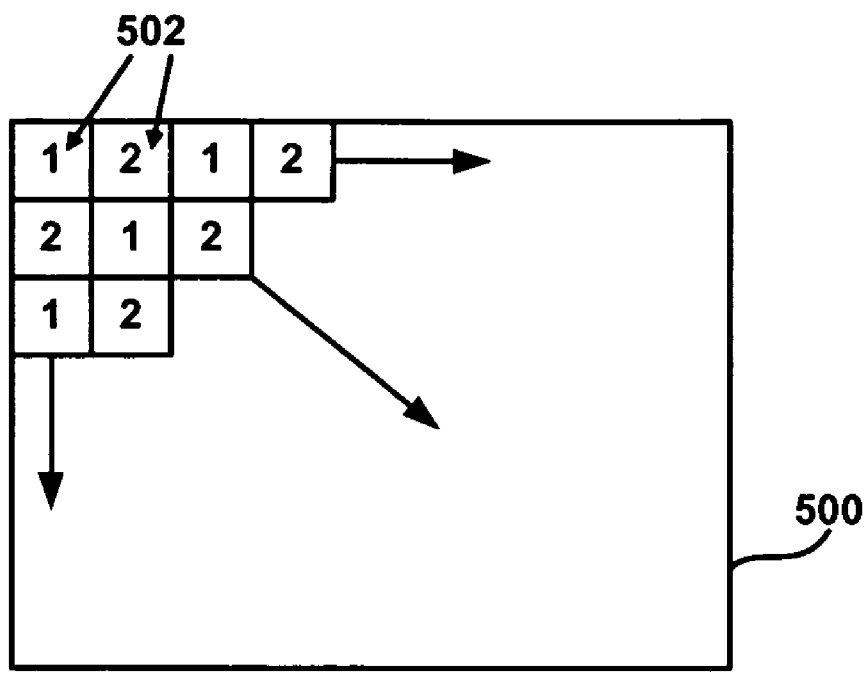
FIG. 5 is an illustration of an exemplary imager comprising a patterned filter in accordance with embodiments of the present invention.

FIG. 5 is an illustration of an exemplary sensor 500 comprising a patterned filter in accordance with embodiments of the present invention. Sensor 500 is incorporated into imager 206 and in one embodiment of the invention is configured as a complementary metal-oxide semiconductor (CMOS) imaging sensor. Sensor 500 may be implemented with other types of imaging devices in other embodiments in accordance with the invention, such as, for example, a charge-coupled device (CCD) imager.

Patterned filter layer 502 is formed on sensor 500 using different filter materials shaped into a checkerboard pattern in one embodiment of the invention. It is appreciated that the filter 500 could be any number of shapes or configurations in accordance with embodiments of the invention. The two filters (e.g., 1 and 2) are determined by the wavelengths being used by light source 302. For example, in this embodiment in accordance with the invention, patterned filter layer 502 includes regions (identified as 1) that include a filter material for selecting the wavelength used by light source 302, while other regions (identified as 2) include a filter material for selecting another wavelength.

In one embodiment of the invention, patterned filter layer 502 is deposited as a separate layer of sensor 500, such as, for example, on top of an underlying layer, using conventional deposition and photolithography processes while still in wafer form. In another embodiment in accordance with the invention, patterned filter layer 502 can be a separate element between sensor 500 and incident light. Additionally, the pattern of the filter materials can be configured in a pattern other than a checkerboard pattern. For example, patterned filter layer 502 can be formed into an interlaced striped or a non-symmetrical configuration (e.g. a 3-pixel by 2-pixel shape). Patterned filter layer 502 may also be incorporated with other functions, such as color imagers.

Various types of filter materials can be used in patterned filter layer 502. In this embodiment in accordance with the invention, the filter materials include polymers doped with pigments or dyes. In other embodiments in accordance with the invention, the filter materials may include interference filters, reflective filters, and absorbing filters made of semiconductors, other inorganic materials, or organic materials. In one embodiment of the invention, filter layer 502 of sensor 500 converts an image captured by the imager into a binary image comprising two channels of information.

Figure 6:
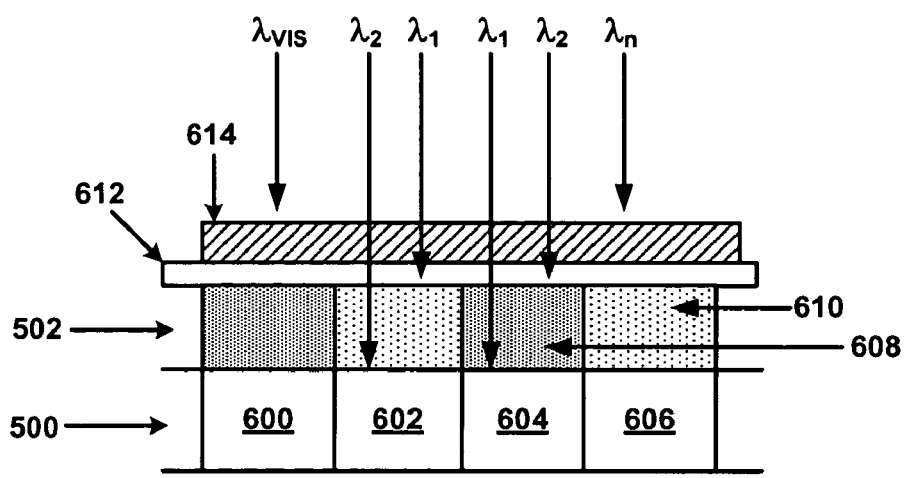
FIG. 6 is a cross section of an exemplary imager in accordance with embodiments of the present invention.

FIG. 6 is a cross section of an exemplary imager 206 in accordance with embodiments of the present invention. Only a portion of imager 206 is shown in this figure. Imager 206 includes sensor 500 comprised of pixels 600, 602, 604, 606, patterned filter layer 502 including two alternating filter regions 608, 610, optional glass cover 612, and dual-band narrowband filter 614. In one embodiment of the invention, sensor 500 is configured as a CMOS imager and patterned filter layer 502 as two polymers 608, 610 doped with pigments or dyes. Each region in patterned filter layer 502 (e.g. a square in the checkerboard pattern) overlies a pixel in the CMOS imager.

Narrowband filter 614 and patterned filter layer 502 form a hybrid filter in this embodiment in accordance with the invention. When light strikes narrowband filter 614, the light at wavelengths other than the wavelengths of interest are filtered out, or blocked, from passing through the narrowband filter 614. Light propagating at visible wavelengths (lamda sub.VIS) and wavelengths (lamda sub.n) is filtered out in this embodiment, where lamda sub.n represents a wavelength other than lamda sub.1, lamda sub.2, and lamda sub.VIS. Light propagating at or near wavelengths lamda sub.1 and lamda sub.2 transmit through narrowband filter 614. Thus, only light at or near the wavelengths lamda sub.1 and lamda sub.2 passes through glass cover 612. Thereafter, polymer 608 transmits the light at wavelength lamda sub.1 while blocking the light at wavelength lamda sub.2. Consequently, pixels 600 and 604 receive only the light at wavelength lamda sub.1.

Polymer 610 transmits the light at wavelength .lamda..sub.2 while blocking the light at wavelength .lamda..sub.1, so that pixels 602 and 606 receive only the light at wavelength lamda sub.2. In this manner, a binary image is generated. The binary image comprises two channels, wherein one channel represents light at lamda sub.1 and the other channel represents light at lamda sub.2.

In one embodiment of the invention, narrowband filter 614 is a dielectric stack filter. Dielectric stack filters are designed to have particular spectral properties. In this embodiment in accordance with the invention, the dielectric stack filter is formed as a dual-band narrowband filter. Narrowband filter 614 is designed to have one peak at lamda sub.1 and another peak at lamda sub.2.

Figure 7:
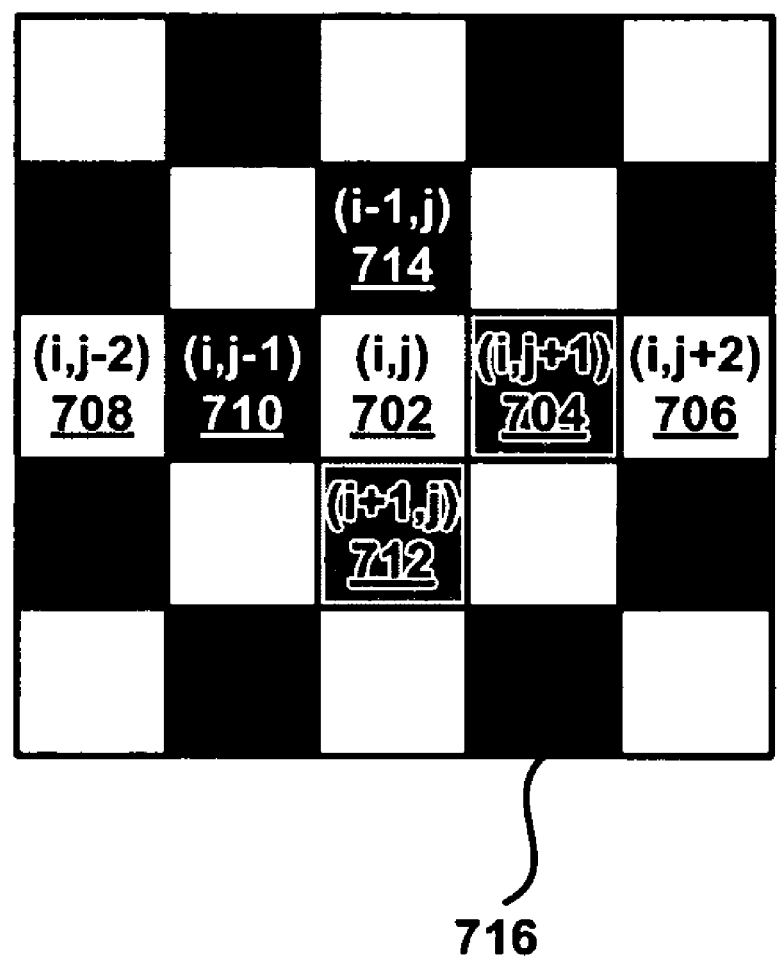
FIG. 7 is an illustration of an exemplary patterned image comprising a pixel of interest in accordance with embodiments of the present invention.

FIG. 7 is an illustration of an exemplary patterned image 700 comprising a pixel of interest 702 in accordance with embodiments of the present invention. In one embodiment of the invention, contrast values are found in a plurality of locations around a pixel of interest to determine if a pixel of interest represents an artifact. In one embodiment of the invention, at least four contrast values associated with four directions normal to the side faces of a pixel of interest are considered to determine if a particular pixel represents an artifact. In one embodiment of the invention, the condition for a pixel not to be excluded is that all of the contrast values must exceed a threshold contrast value. In one embodiment of the invention, the threshold contrast value can be either global (e.g., across all pixels) or vary locally (e.g., according to local pixel values). In one embodiment of the invention, the threshold values are stored in a memory that can be accessed by the imager and/or the image processor. In one embodiment of the invention, local thresholds can be a function of an average local intensity with an optional minimum value. Local thresholds can also incorporate gradient characteristics measured over a larger scale than the contrast values.

The simplest set of four contrast values for pixel 702$(l,j)$ where p is the pixel value is:

$C1=p(i,j)-p(i,j+1)$ $C1$=(pixel value of pixel 702)−(pixel value of pixel 704)

$C2=p(i,j)-p(i-1,j)$ $C2$=(pixel value of pixel 702)−(pixel value of pixel 714)

$C3=p(i,j)-p(i,j-1)$ $C3$=(pixel value of pixel 702)−(pixel value of pixel 710)

$C4=p(l,j)-p(i+1,j)$ $C1$=(pixel value of pixel 702)−(pixel value of pixel 712)

In addition to measuring four contrast values with four neighboring face pixels, further contrast values can be calculated. These may include either diagonal pixel values and/or pixels further away than nearest face values. For example, $C=p(l,j)-p(i+2,j+1)$, which means (pixel value of pixel 702)−(pixel value of pixel 716). Another example is $C=[p(l,j)-p(l,j+2)]/2-p(l,j+1)$. In this example, a gradient value is used, [(Pixel value of pixel 702)−(pixel value of pixel 706)] divided by two minus the pixel value of pixel 704.

The procedure described above can be amended to allow one or more individual contrast values to exceed their threshold under specific conditions. These conditions are typically the result of testing and are designed to capture any conditions where analysis errors might still occur. For example, a specific rule may be developed to handle an object that has a known gradient characteristic.

In one embodiment of the invention, explicit knowledge as to which pixels should be brighter is stored in a memory coupled to the imager. If a contrast value is reversed, that is showing the normally brighter pixel to be darker than a neighbor's, this is also indicative of an artifact. In one embodiment of the invention, once the pixels have been identified for exclusion, the pixel map may be optionally dilated to extend the exclusion region.

FIG. 8 is a data flow diagram of an exemplary method 800 for detecting artifacts in an image in accordance with embodiments of the present invention.

At step 802, method 800 includes emitting light at an object, the object comprising a retroreflector. In one embodiment of the invention, the light is substantially an infrared wavelength. In one embodiment of the invention, the retroreflector comprises a bandpass wavelength filter for reflecting only light within a particular band of wavelength.

At step 804, method 800 includes capturing an image of the object by using light reflected from the object, the image comprising a plurality of pixels. In one embodiment of the invention, the image is filtered. In one embodiment of the invention, a patterned light filter is used to generate a patterned image.

At step 806, method 800 includes defining and using at least one computed contrast value associated with at least one of the plurality of pixels to identify an artifact. In one embodiment of the invention, a gradient value is computed by computing a contrast gradient between a plurality of pixels.

In one embodiment of the invention, step 806 further includes comparing a computed contrast value associated with at least one of the plurality of pixels to a threshold contrast value, wherein computed contrast values less than the threshold contrast value indicate an artifact. In one embodiment of the invention, the threshold contrast value is a function of light intensity associated with at least one of the plurality of pixels.

Figure 9:
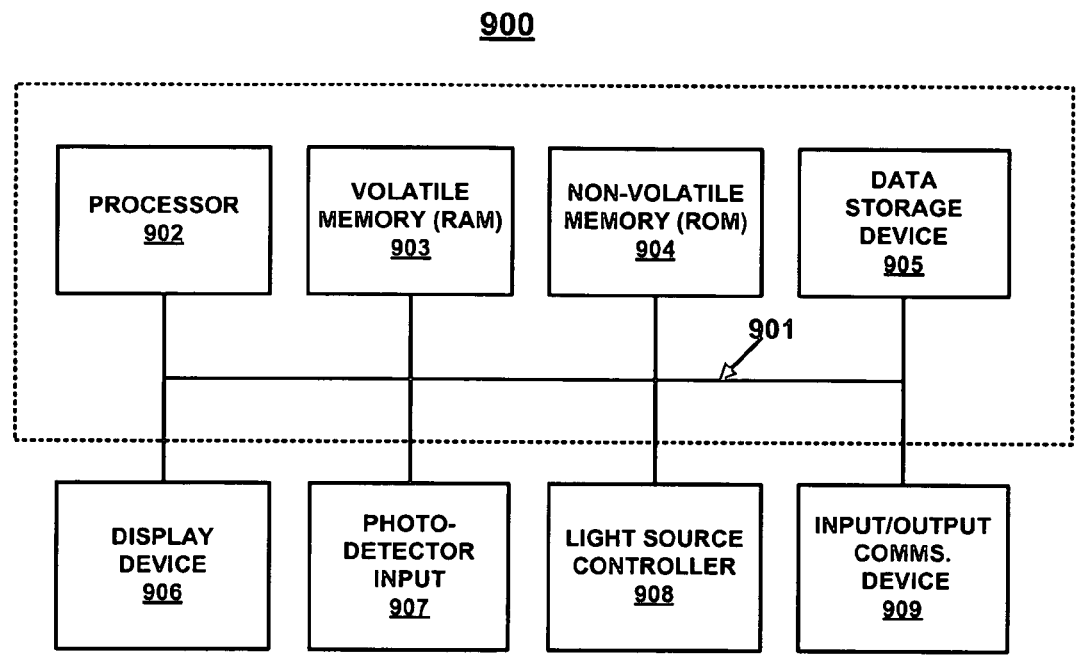
FIG. 9 is a block diagram of an exemplary computer system in accordance with embodiments of the present invention.

Referring now to FIG. 9, a block diagram of exemplary computer system 900 is shown. It is appreciated that computer system 900 of FIG. 9 described herein illustrates an exemplary configuration of an operational platform upon which embodiments of the present invention can be implemented. Nevertheless, other computer systems with differing configurations can also be used in place of computer system 900 within the scope of the present invention. For example, computer system 900 could be a server system, a node on a network, a personal computer or an embedded computer system such as a mobile telephone or pager system. Furthermore, computer system 900 could be a multiprocessor computer system.

Computer system 900 includes an address/data bus 901 for communicating information, a central processor 902 coupled with bus 901 for processing information and instructions, a volatile memory unit 903 (e.g., random access memory, static RAM, dynamic RAM, etc.) coupled with bus 901 for storing information and instructions for central processor 902 and a non-volatile memory unit 904 (e.g., read only memory, programmable ROM, flash memory, EPROM, EEPROM, etc.) coupled with bus 901 for storing static information and instructions for processor 902. Computer system 900 may also contain an optional display device 906 coupled to bus 901 for displaying information to the computer user. Moreover, computer system 900 also includes a data storage device 905 (e.g., disk drive) for storing information and instructions.

Also included in computer system 900 of FIG. 9 is an optional photodetector input 907. Photodetector input 907 can communicate information and command selections to central processor 902. Computer system 900 also includes light source controller 908 coupled to bus 901. In one embodiment of the invention characteristics of a light source can be manipulated by a signal generated by light source controller 908. Computer system 900 also includes signal communication interface 909, which is also coupled to bus 901, and can be a serial port. Communication interface 909 can also include number of wireless communication mechanisms such as infrared or a Bluetooth protocol.

Embodiments of the present invention, a system and method for identifying artifacts of an image have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system, comprising:
an input to receive images from an imager, said images including a first image generated by reflecting light off an object, said first image comprising a pattern of pixels with a first pixel of interest, a selected pixel, and a second pixel located in the pattern; and
and a processor, coupled to said input, the processor used to determine a contrast value and then identify an artifact in said first image based on the contrast value, the contrast value being determined by obtaining a first result which is determined by subtracting a pixel value of the first pixel of interest from a pixel value of the selected pixel, and then dividing the first result by a divisor term to obtain a second result, and then subtracting a pixel value of the second pixel from the second result.

2. The system as described in claim 1, further comprising: a light source for emitting light towards said object; and a light wavelength filter disposed on at least one of a retroflector on the object and the imager for filtering out a selected range of wavelengths of light, the range of wavelengths excluding a wavelength of light emitted by the light source.

3. The system as described in claim 2, wherein said images from said imager are received at said input simultaneously, wherein the light wavelength filter is a patterned light filter that filters an image to produce filtered light comprising a binary image, and wherein a first optical channel of the filtered light comprises the wavelength of light emitted by the light source and a second optical channel of the filtered light comprises a wavelength of light not emitted by the light source.

4. The system as described in claim 2, wherein said images from said imager are received successively, wherein the light wavelength filter is a patterned light filter that filters an image to produce filtered light comprising a binary image, and wherein a first optical channel of the filtered light comprises the wavelength of light emitted by the light source and a second optical channel of the filtered light comprises a wavelength of light not emitted by the light source.

5. The system as described in claim 1, wherein said imager comprises a light filter for filtering wavelengths of light other than a wavelength band associated with light reflected off said object, wherein the light filter comprises a dielectric stack filter, and a patterned light filter that filters an image to produce filtered light comprising a binary image.

6. The system as described in claim 1, wherein the pattern comprises a 3×3 pattern having the first pixel in the middle of the pattern, wherein the processor is further configured to determine an additional contrast value based on at least one additional pixel located outside the 3×3 pattern, wherein the additional contrast value is determined by subtracting a pixel value of the at least one additional pixel from the pixel value of the first pixel.

7. A system, comprising:
a light source to emit light at an object, said object comprising a retroreflector; an imager for capturing a plurality of images of said object by using light reflected from said retroreflector, said plurality of images comprising a plurality of pixels; and a processor coupled to said imager to determine a gradient contrast value associated with said plurality of pixels to identify said retroreflector, the gradient contrast value determined by subtracting a first pixel value of a first pixel from the plurality of pixels from a second pixel value of a second pixel from the plurality of pixels, wherein said gradient contrast value is associated with at least three of said plurality of pixels and defined by obtaining a first result which is determined by subtracting the first pixel value from the second pixel value and dividing the first result by a divisor term to obtain a second result and then subtracting a third pixel value from the second result.

8. The system as described in claim 7, wherein said retroreflector comprises a wavelength dependent filter for filtering a wavelength of light, wherein the wavelength dependent filter is a patterned light filter that filters an image to produce filtered light comprising a binary image, and wherein a first optical channel of the filtered light comprises the wavelength of light emitted by the light source and a second optical channel of the filtered light comprises a wavelength of light not emitted by the light source.

9. The system as described in claim 7, wherein said imager further comprises:
a wavelength filter for filtering said images into binary images, wherein the wavelength filter is a patterned light filter that filters an image to produce filtered light comprising the binary image, and wherein a first optical channel of the filtered light comprises the wavelength of light emitted by the light source and a second optical channel of the filtered light comprises a wavelength of light not emitted by the light source.

10. The system as described in claim 7, wherein the first pixel is not adjacent to the second pixel, wherein said computed contrast value is compared to a threshold contrast value, and wherein a computed contrast value greater than said threshold contrast value indicates an artifact.

11. The system as described in claim 7, wherein the first pixel value is a pixel intensity of a selected pixel, wherein the second pixel value is a pixel intensity of the second pixel located non-adjacent to the selected pixel, and wherein the third pixel value is a pixel intensity of a third pixel located adjacent to the selected pixel.

12. A method, comprising:
emitting light at an object, said object comprising a retroreflector;
capturing an image of said retroreflector by using light reflected from said retroreflector, said image comprising a plurality of pixels; and
determining at least one contrast value for identifying an artifact in the image, said at least one contrast value determined by subtracting a pixel value of at least one non-adjacent pixel from a pixel value of a pixel of interest to obtain a first result, then dividing the first result by a divisor term to obtain a second result, and then subtracting a pixel value of a second pixel from the second result.

13. The method as described in claim 12, wherein said light source generates a substantially infrared wavelength of light and wherein said pixel values correspond to a pixel intensity.

14. The method as described in claim 12, further comprising: filtering said image into a binary image, the binary image comprising a first optical channel of the filtered light comprising the wavelength of light emitted by the light source and a second optical channel of the filtered light comprising a wavelength of light not emitted by the light source.

15. The method as described in claim 14, further comprising:
using a checkerboard filter to filter said image into said binary image, the checkerboard filter causing the pixel of interest to receive light of a first wavelength and the at least one adjacent pixel to receive light of a second wavelength.

* * * * *